United States Patent [19]

Kerner, Jr.

[11] Patent Number: 4,646,869
[45] Date of Patent: Mar. 3, 1987

[54] ADJUSTABLE CONTROL CONSOLE

[75] Inventor: Hadyn H. Kerner, Jr., Glendale Hgts., Ill.

[73] Assignee: Dresser Industries, Inc., Dallas, Tex.

[21] Appl. No.: 759,709

[22] Filed: Jul. 29, 1985

[51] Int. Cl.⁴ ............................................ B62D 1/12
[52] U.S. Cl. ..................................... 180/334; 74/493; 280/775
[58] Field of Search ............... 180/315, 326, 329, 334; 180/332, 333; 280/775; 74/492, 493, 495

[56] References Cited

U.S. PATENT DOCUMENTS 3,628,396 12/1971 Grobowski ......................... 280/775
4,033,158 7/1977 Chamberlain ....................... 280/775
4,291,896 9/1981 Koch .................................. 180/334
4,478,308 10/1984 Klaassen ............................. 180/334

FOREIGN PATENT DOCUMENTS 2754543 6/1978 Fed. Rep. of Germany ...... 180/334

Primary Examiner—John J. Love
Assistant Examiner—Everett G. Diederiks, Jr.

[57] ABSTRACT

An adjustable control console is provided that includes an operator controlled latch mechanism wherein the console and the control lever therein can be pivoted to a position selected by the operator. The steering levers and the engine speed lever include extensions which extend through the pivotal axis of the console whereby repositioning of the console does not affect engine speed or steering control of the dozer.

6 Claims, 4 Drawing Figures

ADJUSTABLE CONTROL CONSOLE

BACKGROUND OF THE INVENTION

This invention relates generally to controls for vehicles such as bulldozers and the like. More particularly, but not by way of limitation, this invention relates to an adjustable control console for such vehicles.

In general, adjustable controls and control stations are well known in connection with vehicles. For example, adjustable steering columns are utilized on many currently manufactured automobiles.

Adjustable control consoles have also been utilized in the past in connection with vehicles such as bulldozers, road graders, and other like equipment. U.S. Pat. No. 3,737,003 issued June 5, 1973, to Duane E. Beals et al discloses apparatus providing for the adjustment of the steering wheel and other controls of an earth moving vehicle such as a motor grader. In particular, the controls disclosed therein are arranged so that the operators can have reasonable access to such controls whether sitting or standing.

German Patent No. 27 54 543 issued June 15, 1978, illustrates a control console that is adjustable to permit operator ingress to and egress from the operators seat located on a bulldozer or the like.

In the case of the German patent, the controls are not usable when the console is moved to the rear position. In the case of the U.S. patent, the controls are usable in the various positions of adjustment. However, in both cases the system utilized to provide the adjustment is a parallelogram so that the attitude of the controls is maintained constant.

An object of this invention is to provide an adjustable control console that can be selectively located at various positions with varying control attitudes so that the operator can adjust the console to a position wherein the controls are most convenient and comfortable for his individual stature.

SUMMARY OF THE INVENTION

Accordingly, this invention provides an adjustable control console for bulldozers and the like wherein the console housing is pivotally mounted in a console support that is located adjacent to the operator's seat. The control console includes apparatus for pivotally and adjustably connecting the housing to the console support and forming a pivot axis therewith. Engine controls for determining the engine speed are mounted in the housing for movement with the housing and for pivotal movement relative to the housing. Steering control apparatus is mounted on the housing for controlling the steering mechanism. The steering control apparatus is moveable with the housing and pivotal relative thereto. Each of the engine control apparatus and steering control apparatus includes linkage for connection with the engine and with the steering mechanism, respectively. Each has a portion of the linkage passing through the pivot axis whereby pivoting of the housing has little or no effect on the engine and steering mechanism.

A BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE PREFERRED EMBODIMENT

Figure 1:
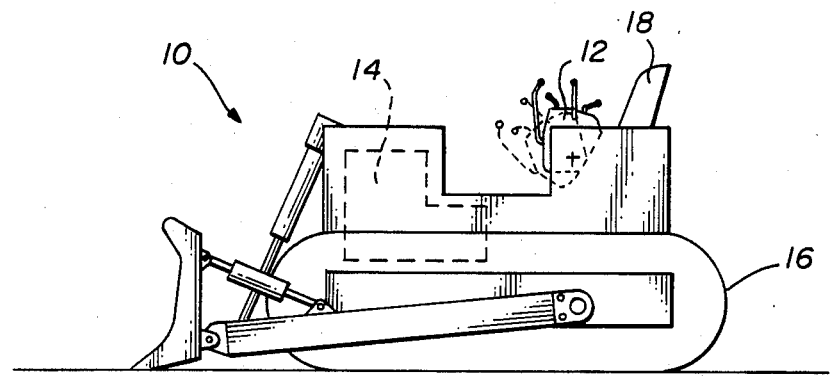
FIG. 1 is a schematic elevation view of a bulldozer having a control console constructed in accordance with the invention located therein.

Referring to the drawing and to FIG. 1 in particular, shown therein and generally designated by the reference character 10 is a bulldozer including an adjustable control 12 console that is constructed in accordance with the invention.

In addition to the console 12, the bulldozer also includes an engine 14, shown in dash lines, tracks 16 driven by the engine 14, and an operator's seat 18. The dozer 10 is steered by clutches and brakes (not shown) associated with the tracks 16 as is well known.

Figure 2:
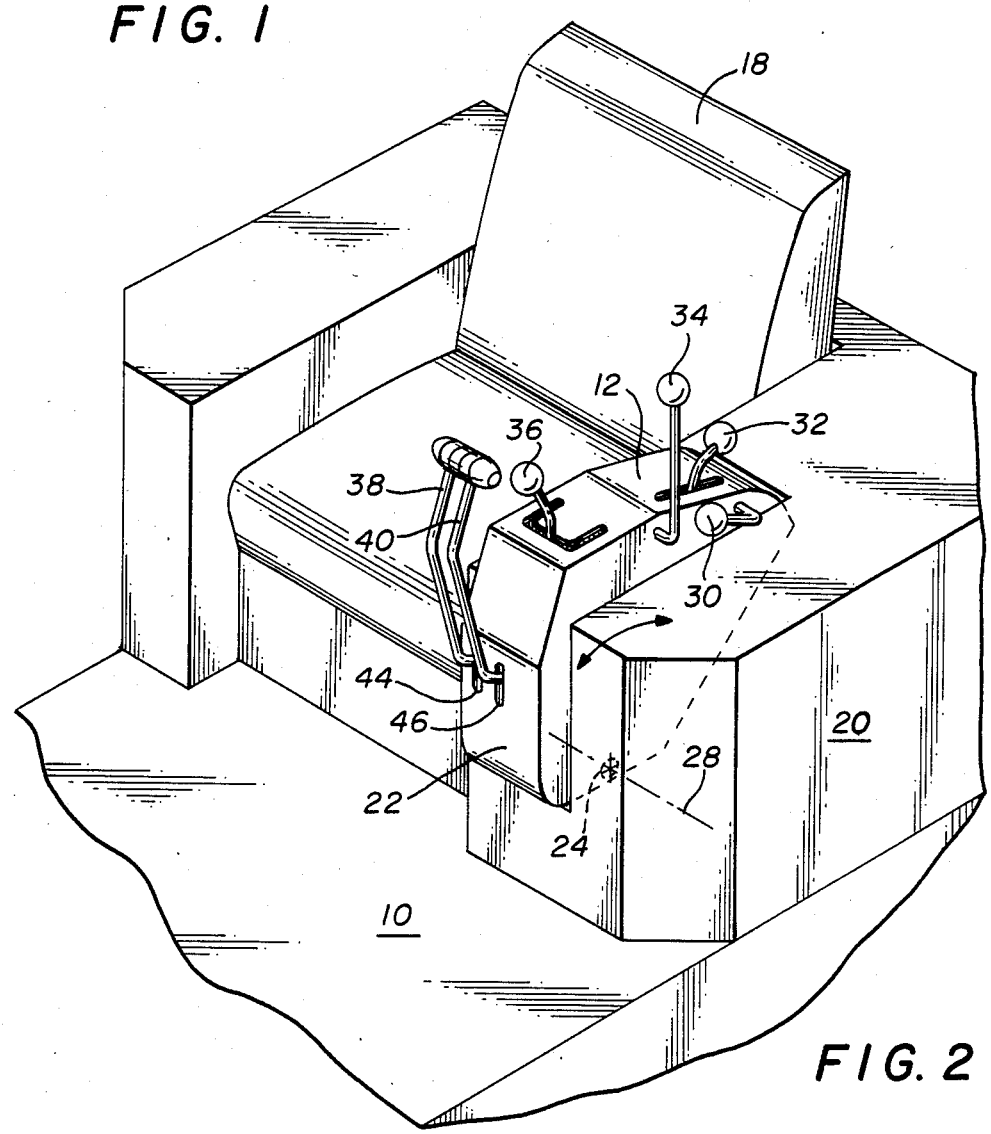
FIG. 2 is a pictorial view of adjustable control console that is constructed in accordance with the invention located on a portion of a bulldozer of FIG. 1.
Figure 3:
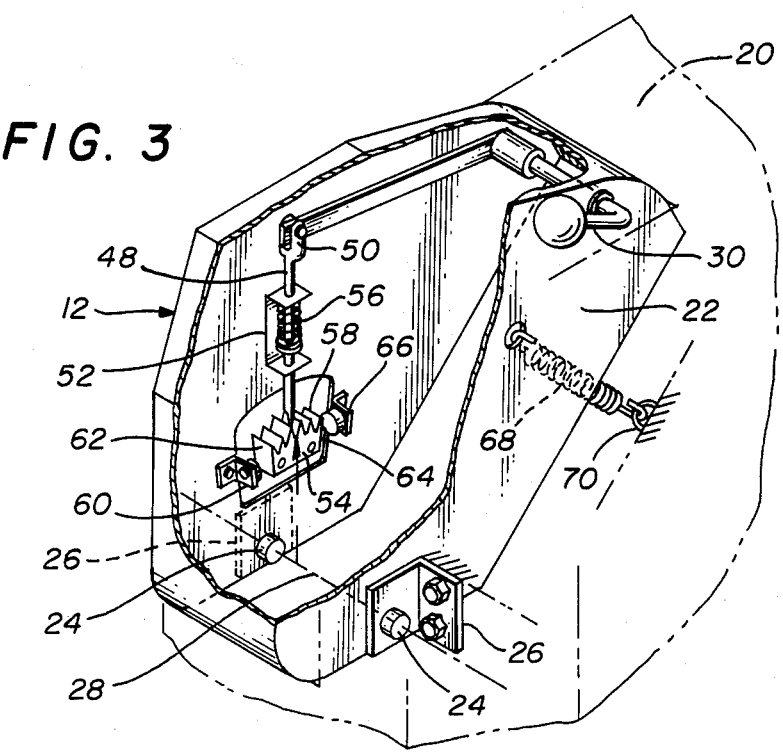
FIG. 3 is an enlarged, fragmentary view of the console of FIG. 1, which more clearly illustrates the console latch mechanism.
Figure 4:
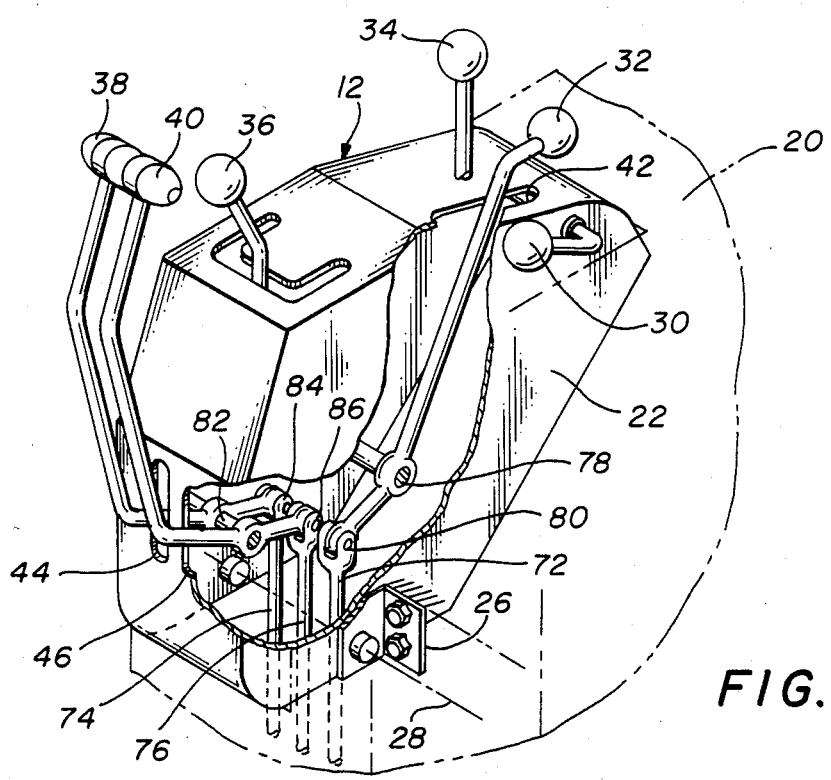
FIG. 4 is a view similar to FIG. 3, but illustrates the engine and steering controls in more detail.

As can be seen in FIGS. 2, 3 and 4, the console 12 is pivotally mounted on a console support 20 and includes a hollow console housing 22 carrying pivot pins 24. Brackets 26 (see FIG. 3) are mounted on the console support 20. The pivot pins 24 form a pivot axis 28 about which the console 12 pivots. The console support 20 is appropriately mounted on the bulldozer 10.

As shown in FIG. 2, a number of control levers extend from the console housing 22. More specifically, the levers are: a console latch lever 30, a speed control lever 32, a safety lever 34, a transmission control lever 36, a steering control lever 38 and a second steering control lever 40.

All of the levers 30, 32, 34, 36, 38 and 40 are arranged to move with the housing 22 when the console 12 is pivoted to its various positions so that they remain in the same relative position with respect to each other. Each of the levers is also arranged to be moved relative to the console housing 22 to perform its operating function. The engine speed control lever 34 and the steering levers 38 and 40 project through slots 42, 44, and 46 respectively that are formed in the housing 22 to provide room for movement of those levers relative to the housing 22.

The structure and operation of the latch mechanism which permits pivoting of the console 12 about the pivot axis 28 and relative to the console support 20 is illustrated in the enlarged fragmentary view of FIG. 3. As shown therein, the latch lever 30 extends through the housing 22 and is pivotal relative thereto. The opposite end of the lever 30 is connected to a moveable latch member 48 by a clevis 50. A bracket 52 mounted to the inside of the housing 22 supports the moveable latch member 48 and limits its movement to a reciprocating motion toward and away from a fixed latch member 54 that is mounted on the console support 20. The moveable latch member 48 is encircled by a spring 56 which constantly biases the moveable latch member 48 toward the latch member 54.

The fixed latch member 54 has an outer peripheral surface that is serrated forming teeth 58 thereon. It will be noted that the peripheral surface is described by an arc having a radius R which has as its line the pivotal axis 28. The arrangement of the teeth 58 and the moveable latch member 48 provides a finite, but relatively large number of pivotal positions for the console 12 relative to the support 20.

A stop 60 mounted on the housing 22 is arranged to engage an end 62 on the fixed latch member 54 to limit the travel of the console 12 in the rearward direction. The forward motion of the console 12 is limited by the engagement of a surface 64 on the fixed latch member 54 with a second stop 66 that is also mounted on the housing 22.

To make the console 12 more stable during pivotal movement, a tension spring 68 has one end attached to the housing 22 and the opposite end attached to a U-bolt 70 or the like that is connected to the console support 20.

While the console 12 will not ordinarily be repositioned when the dozer 10 is in operation, it is highly desirable that none of the operations functions are affected if the console 12 is repositioned during operation. Extensions 72, 74 and 76 of the levers 32, 38, and 40, respectively, extend through the pivotal axis 28 of the housing 22. More specifically, the lever 32 is pivoted at 78 on the housing 22 and is connected by a clevis 80 to the extension 72 thereof. Similarly, the levers 38 and 40 are connected at pivot 82 to the housing 22 and are connected by clevises 84 and 86 respectively to their extensions 74 and 76. While the knob ends of the levers will be repositioned during movement of the console 12 to satisfy operator requirements, there will be little or no effect on the stated functions.

The remaining control levers, 34 and 36, if used to mechanically perform their intended functions will also extend through the pivot axis 28. However, their functions may be carried out through appropriate pneumatic, electric or hydraulic controls actuated by the levers which do not require the described mechanical linkage. Whichever arrangement is selected, all the control levers pivot with the console 12 and maintain their relative positions at all times.

OPERATION OF THE PREFERRED EMBODIMENT

When it is desired to operate the bulldozer 10, the operator or driver sits in the seat 18. To adjust the console 12 to a position wherein the operating levers are at the most comfortable position for him, the operator lifts upwardly on the latch lever 30 which pulls the moveable latch member 48 out of the teeth 58 in the fixed latch member 54. He may then tilt the console 12 forwardly or rearwardly to the desired position in which the various operating levels are most convenient to him. Upon reaching this position, he releases the latch handle 30 and the spring 56 returns the moveable latch member 48 into engagement with teeth 58 securely latching the housing 22 against movement relative to the console support 20.

During the adjustment of the console 12, it will be appreciated that all of the levers will move therewith, that is the knob ends on the levers will move so that they are in the desired position for the operator. However, even though the levers are repositioned, the engine speed control extension 72 and the steering extensions 74 and 76 have little if any effect on the engine speed and steering since they do extend through the pivot axis 28 for the console 12. Thus, and even through the dozer 10 may be in operation, the steering and engine speed will not be affected by pivotal movement of the console 12.

The adjustable console described in detail hereinbefore can be selectively located at a plurality of discrete pivotal positions wherein they are located in the most convenient and comfortable position for the particular stature of the operator. If the operators change, the console can be quickly and easily repositioned as desired and all controls function in all positions of the console.

Having described but a single embodiment of the invention in detail, it will be understood that many changes and modifications can be made thereto without departing from the spirit or scope of the invention.

What I claim is:

1. An adjustable control console for vehicles wherein the vehicle has an engine, a transmission, a steering mechanism, and an operator's seat comprising in combination:
   a console support located adjacent to the seat and mounted on the bulldozer;
   a hollow console housing located in said support;
   means for pivotally and adjustably connecting said housing to said console support and forming a pivot axis therewith;
   engine control means mounted on said housing for determining the engine speed, said engine control means being mounted on said housing for movement with said housing and for pivotal movement relative to said housing;
   steering control means mounted on said housing for controlling the steering mechanism, said steering control means being mounted on said housing for movement with said housing and for pivotal movement relative to said housing; and,
   each of said engine control means and steering control means including a first linkage member having one end projecting through said housing for engagement by the operator, a second end pivotally connected to the first end of a second linkage member, an intermediate portion of said first linkage member pivotally connected to said housing, each said second linkage member having a second end for connection with said engine and steering mechanism, respectively, and each second linkage member having an intermediate portion disposed perpendicularly to and extending proximate said pivot axis whereby pivoting of said housing has a minimal effect on the engine and steering mechanism.

2. The console of claim 1 wherein said means for pivotally and adjustable connecting said housing to the control console support includes:
   at least one pivot pin connecting said housing and said support;
   a moveable latch member mounted on said housing for movement between latched and unlatched positions; and,
   a fixed latch member on said support and engageable with said moveable latch member to position said housing in selected positions relative to said support.

3. The console of claim 2 wherein:
   said fixed latch member includes a serrated surface disposed in an arc having said pivot axis as its center; and,
   said moveable latch member has one end arranged to engage said serrated surface to latch said housing in the desired position relative to said support.

4. The console of claim 3 and also including resilient means biasing said moveable latch member toward said fixed latch member.

5. The console of claim 4 and also including resilient means biasing said housing in one pivotal direction about said pivot axis.

6. The console of claim 5 and also including stop means that includes spaced first and second stop members mounted on said housing and located to engage said fixed latch member to limit the pivotal movement of said housing in both directions relative to said support.

* * * * *